(12) United States Patent
Rosedale

(10) Patent No.: US 7,117,136 B1
(45) Date of Patent: Oct. 3, 2006

(54) INPUT AND FEEDBACK SYSTEM

(75) Inventor: Philip Rosedale, San Francisco, CA (US)

(73) Assignee: Linden Research, Inc., San Francisco, CA (US)

( * ) Notice: Subject to any disclaimer, the term of this patent is extended or adjusted under 35 U.S.C. 154(b) by 1053 days.

(21) Appl. No.: 09/641,591

(22) Filed: Aug. 18, 2000

(51) Int. Cl.
*G06G 7/48* (2006.01)
*G09G 5/08* (2006.01)
*G09B 9/02* (2006.01)

(52) U.S. Cl. ............................. 703/7; 345/161; 434/29

(58) Field of Classification Search .................... 703/7; 434/45; 345/156, 161; 482/900
See application file for complete search history.

(56) References Cited

U.S. PATENT DOCUMENTS

| | | | |
|---|---|---|---|
| 4,315,241 A * | 2/1982 | Spooner | 340/980 |
| 4,463,380 A | 7/1984 | Hooks, Jr. | |
| 4,492,233 A * | 1/1985 | Petrofsky et al. | 607/48 |
| 4,715,005 A | 12/1987 | Heartz | |
| 5,097,412 A | 3/1992 | Orimo et al. | |
| 5,519,848 A | 5/1996 | Wloka et al. | |
| 5,533,531 A * | 7/1996 | Edwards et al. | 600/595 |
| 5,564,107 A | 10/1996 | Atalla | |
| 5,575,809 A * | 11/1996 | Sasaki | 607/62 |
| 5,594,915 A | 1/1997 | Atalla | |
| 5,643,087 A * | 7/1997 | Marcus et al. | 463/38 |
| 5,652,871 A | 7/1997 | Steinman et al. | |
| 5,673,198 A | 9/1997 | Lawman et al. | |
| 5,715,184 A | 2/1998 | Tyler et al. | |
| 5,734,373 A * | 3/1998 | Rosenberg et al. | 345/161 |
| 5,734,421 A * | 3/1998 | Maguire, Jr. | 348/121 |
| 5,748,180 A * | 5/1998 | Inukai | 345/161 |
| 5,762,612 A * | 6/1998 | Campbell | 600/558 |
| 5,801,938 A | 9/1998 | Kalantery | |
| 5,805,824 A | 9/1998 | Kappe | |
| 5,815,793 A | 9/1998 | Ferguson | |
| 5,844,594 A | 12/1998 | Ferguson | |
| 5,850,201 A * | 12/1998 | Lasko-Harvill et al. | 345/8 |
| 5,850,345 A | 12/1998 | Son | |
| 5,881,267 A | 3/1999 | Dearth et al. | |
| 5,910,903 A | 6/1999 | Feinberg et al. | |
| 5,929,861 A | 7/1999 | Small | |

(Continued)

OTHER PUBLICATIONS

Goodwin, G.M et al. Proprioceptive Illusions Induced by Muscel Vibration: Contribution by Muscle Spindles to Perception? Science 175: p. 1382-1384.*

(Continued)

*Primary Examiner*—Anthony Knight
*Assistant Examiner*—Tom Stevens
(74) *Attorney, Agent, or Firm*—Vierra Magen Marcus & DeNiro LLP

(57) ABSTRACT

An input and feedback system for use with simulator devices immobilizes a portion of the user's body using a securement device which holds the immobilized portion in a fixed position. Pressure sensors are disposed upon the securement device to detect the force resulting from any attempted motion of the immobilized body part. Signals describing these forces are sent to a processing unit which applies this information to a simulated environment and provides sensory feedback to the user of the this simulated environment. Feedback is provided via vibrating elements which provide a sensation to the user corresponding to the motion of the user's muscles which occur in the simulated environment. Feedback is also provided via a screen which is disposed in front of the head of the user. Such immobilizing devices may be used to allow input and feedback based on the motion of various parts of the user's body, such as the head, arms, legs, and torso.

58 Claims, 6 Drawing Sheets

U.S. PATENT DOCUMENTS

| | | |
|---|---|---|
| 5,963,731 A | 10/1999 | Sagawa et al. |
| 6,003,065 A | 12/1999 | Yan et al. |
| 6,005,548 A * | 12/1999 | Latypov et al. ............. 345/156 |
| 6,011,526 A * | 1/2000 | Toyoshima et al. ............ 345/7 |
| 6,031,520 A * | 2/2000 | De Gotari ................... 345/157 |
| 6,031,987 A | 2/2000 | Damani et al. |
| 6,042,555 A * | 3/2000 | Kramer et al. .............. 600/595 |
| 6,052,555 A | 4/2000 | Ferguson |
| 6,088,017 A * | 7/2000 | Tremblay et al. ........... 345/156 |
| 6,106,297 A | 8/2000 | Pollak et al. |
| 6,108,494 A | 8/2000 | Eisenhofer et al. |
| 6,110,217 A | 8/2000 | Kazmierski et al. |
| 6,126,548 A | 10/2000 | Jacobs et al. |
| 6,134,514 A | 10/2000 | Liu et al. |
| 6,183,259 B1 * | 2/2001 | Macri et al. ................. 434/247 |
| 6,183,364 B1 | 2/2001 | Trovato |
| 6,191,800 B1 | 2/2001 | Arenburg et al. |
| 6,192,388 B1 | 2/2001 | Cajolet |
| 6,271,760 B1 * | 8/2001 | Watanabe et al. ........... 340/667 |
| 6,275,213 B1 * | 8/2001 | Tremblay et al. ........... 345/156 |
| 6,281,651 B1 * | 8/2001 | Haanpaa et al. ....... 318/568.11 |
| 6,341,262 B1 | 1/2002 | Damani et al. |
| 6,424,333 B1 * | 7/2002 | Tremblay et al. ........... 345/156 |
| 6,496,200 B1 * | 12/2002 | Snibbe et al. ............... 715/701 |

OTHER PUBLICATIONS

Boutent et al., ("Effects of Placement and Orientation of Body-Fixed Accelerometers on the Assessment of Energy Expenditure during Walking" (1997). Med. & Biol. Eng. & Comput., 1997, p. 50-56.*

Goodwin, G.M., D.I. McCloskey, and P.B.C. Matthews; 1972 Proprioceptive Illusions Induced by Muscle Vibration: Contribution by Muscle Spindles to Perception? Science 175:1382-1384.

Web page for Butterfly.net at www.butterfly.net, 2001.

Web page for Ultima Online at www.uo.com, 2000.

Web page for Everqquest at www.everquest.station.sony.com, 2002.

Miller, Advanced OpenGL Texture Mapping, www.nate.scuzzy.net, Mar. 24, 2000.

* cited by examiner

INPUT AND FEEDBACK SYSTEM

BACKGROUND OF THE INVENTION

1. Field of the Invention

This invention relates to an input system for computer interaction. More specifically, this invention relates to an input system which provides feedback matched to the user's input.

2. Description of the Related Art

A common type of interactive computer experience is the simulation, in which a user is presented with a representation of the experience of performing some other activity. One well-known type of simulator is the flight simulator, in which a user interacts with a computer which presents the user with the visual experience of flying an aircraft. There are many other types of simulators, and training for many activities is carried out through the use of simulators of various kinds.

In order to increase the realism of a simulation, it is desirable to provide an input system which is as similar as possible to the input which would be used in the actual activity. For extremely realistic flight simulators, this can mean providing complete replica cockpits of the aircraft being simulated. However, for simulated activities which are based on ordinary bodily motion (for example, sports simulators of many kinds), providing an intuitive and convenient means to track the actual effort of the muscles of a user is problematic.

Furthermore, in providing output and feedback to the user, greater realism results in a greater impression of being "inside" the simulation. This is referred to as making the experience more "immersive". A perfectly immersive simulation is one in which the user is able to treat the simulation as reality in their actions and responses to what occurs within the simulated environment.

In order to provide more immersive and effective simulations, there is a need for improved input and feedback systems which provide intuitive control and effective feedback to the user as they work in the simulated environment.

SUMMARY OF THE INVENTION

The present invention provides an input system which immobilizes the head of the user with respect to his torso and detects attempts by the user to move his head using strain gauges or other pressure sensors. The signals from these strain gauges are sent to a processing unit which determines the magnitude and direction of the forces which the user is applying, and then uses these forces to determine how to modify a simulated environment. The simulated environment is presented to the user using display and other feedback systems.

In one preferred embodiment of the input system, the user's head is immobilized by having the user sit upon a seat to which a helmet is rigidly fixed. With the user's head securely held within the helmet and the helmet affixed to the seat, the user's head remains in fixed relation to his torso as long as he remains sitting on the seat and wearing the helmet. The helmet is affixed to the seat by support members upon which strain gauges are disposed to measure the minute deflections of the support members. These deflections are caused by forces applied to the helmet by the user as he attempts to turn or elevate his head.

In a further embodiment, the output of the system is presented to the user using a screen which is advantageously disposed in front of the head of the user when wearing the helmet. Because the helmet prevents the user's head from actually rotating or otherwise moving, the field of view of the user is fixed, and the screen can be sized so as to fill the user's field of view at all times during operation of the simulation. In this way a more immersive experience is provided. Additional output can be provided using audio and somatic feedback systems.

In another embodiment of the input system, devices are provided to immobilize the arms, fingers or legs of the user. These devices may also be affixed to the seat of the input device and are also instrumented using strain gauges or other pressure sensors. In this way, forces corresponding to the attempted motions of the arms and legs of the user may also be detected and passed to the processing unit for application to a simulated environment. Any of the systems described above may also include additional systems for immobilizing and detecting the attempted motion of the torso of the user.

DETAILED DESCRIPTION

Figure 1A:
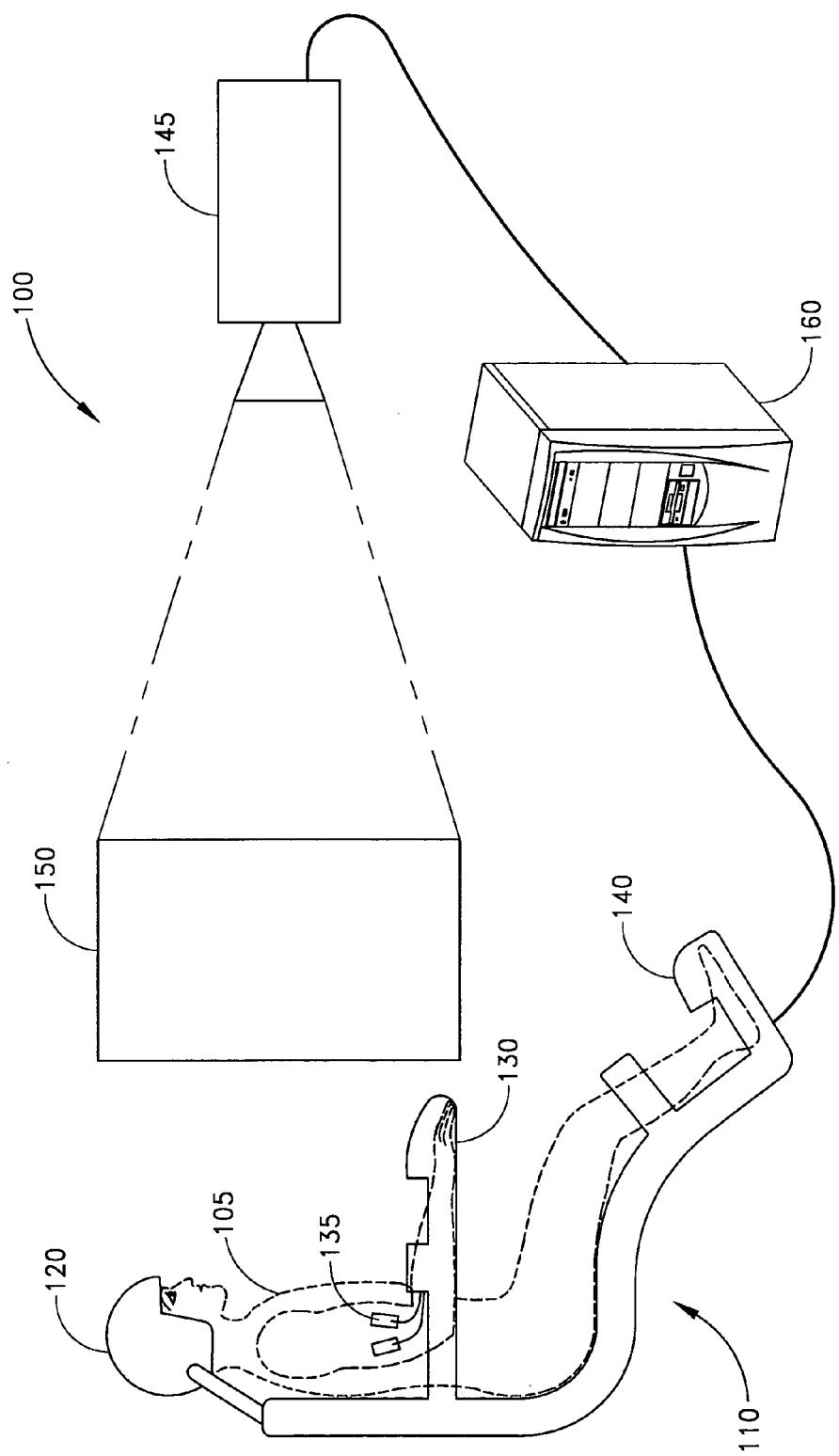
FIG. 1A illustrates a side view of an input and feedback system in accordance with one preferred embodiment of the present invention.

The following description and examples illustrate a preferred embodiment of the present invention in detail. Those of skill in the art will recognize that there are numerous variations and modifications of this invention that are encompassed by its scope. Accordingly, the description of the preferred embodiment should not be deemed to limit the scope of the present invention.

Overview

A system in accordance with a preferred embodiment of the present invention is illustrated in FIG. 1. The input and feedback system 100 generally comprises at least one immobilizing input device 110, an output system, comprising at least a visual display, and a processing system to coordinate the display with the input received from the user. The particular embodiment shown in FIG. 1 includes input systems 120, 130, 140 which immobilize the head, arms, and legs of the user 105, and which use these immobilized areas for input. The display comprises a projector 145 and a rear projection screen 150, as well as an audio system incorporated into the immobilization system itself. The processing system 160 comprises a general purpose computer connected to the inputs of the immobilizing device which is programmed to generate the appropriate audio and visual output for presentation to the user.

The immobilizing input system 110 as shown in FIG. 1 is advantageously built in the form of a chair and is designed to immobilize the head, lower arms, and lower legs of the user. Such a system may also immobilize the shoulders or torso of the user by using additional restraints. In particular, the immobilization of the head is effective in controlling the field of view of the user. In alternate embodiments, the immobilizing input system may be in the form of a reclining chair or couch, rather than an upright chair as shown, or may even hold the user in an upright standing position. The user sits in the input device 110, and is supported as they would be when sitting on an ordinary chair.

Disposed upon the upper portion of the back of the chair is a head immobilizing device 120, which may take different forms as will be described below, and which is shown in FIG. 1A as a helmet which is mounted upon the top of the back of the chair. The user's head is held within this helmet, and the helmet is attached rigidly to the back of the seat of the input device 110. In this way, the user's head is not free to move with respect to the user's upper body, and any attempt to turn or elevate the head of the user will result in a detectable force being imposed upon the helmet of the device.

The input device 110 may also include immobilizing devices 130 for one or both of the arms of the user, as shown in FIG. 1A, as well as immobilizing devices 140 for the legs of the user. These will be described in greater detail below. The input device 110 need not include every one of these immobilizing devices. For many applications, immobilization and input based upon the head of the user and a single hand will be sufficient. Generally, input systems in accordance with the teachings herein will immobilize at least the head of the user in order to control his field of view; any system which does not immobilize the head will need to use an alternate means to control the visual field of the user.

The immobilization devices 120, 130, 140 are connected to strain gauges to measure the magnitude and direction of applied force upon the immobilization devices. These signals are sent to the processing unit 160 for evaluation and calculation of the appropriate modifications to make to the visual display and other outputs of the system.

The processing unit 160 is preferably a computer which has been programmed to simulate the virtual environment for which the input device 110 is configured. One means of accomplishing this is to use a general purpose computer which is capable of being programmed to receive a variety of input signals and to produce a variety of output signals which are appropriate for the simulation of the desired simulated environment. Such systems need not, however, be limited to general purpose computers. Other possible processing units include, without limitation: dedicated hard-wired systems, remotely connected computers, systems which run programs in firmware, personal computers, set-top boxes, gaming consoles, graphics workstations, and other systems such as are known in the art for performing the required calculations.

The processing unit 160 receives information from the strain gauges or other pressure sensors describing the forces which the user is imposing upon the input device 110 as he attempts to move within it. Each signal represents the amount of strain measured by a particular strain gauge. By programming the processing unit 160 with information describing the location and orientation of each strain gauge, the magnitude and direction of the forces applied to each instrumented portion of the input device may be determined. These forces upon the input device correspond to the forces that the user would apply to move in the absence of the immobilizing components 120, 130, 140.

These signals are fed to the processing unit 160, along with any signals from any traditional input systems connected to the processing unit, such as buttons, keyboards, mice, joysticks, or other input devices, which may also be located upon the input system 110 if desired. For instance, if a user is using a gun in the simulated environment, for instance, in a police or military training simulation, it may be advantageous to provide a gun like handle equipped with a trigger. The signal from this trigger, as well as the forces exerted upon this handle may be fed to the processing unit 160 as well.

The processing unit 160 calculates the appropriate changes to make in the simulated environment based upon the forces measured from the input from the user. For example, if the signals from the input system 110 indicate that the user is attempting to turn his head to the left, the processing unit will generate the appropriate display that corresponds with what the user would see if his head turned to the left. Note that the signals which indicate the user is attempting to turn his head are generated by the user exerting a force upon the helmet, but his head never actually turns. This is because the helmet, which is rigidly attached to the chair of the input device 110, holds his head in position.

Similarly, if the input device indicates that the user is exerting force to lift his arm, the processing unit will alter the display and other output to correspond to what would occur if the user's arm was raised, even though the user's actual arm remains in position within the input device.

The type of response in the simulated environment is determined based upon the amount and direction of the force applied by the user, the model of the user used in the simulated environment, and the physics of the simulated environment. These models are programmed into the processing unit 160 and take into account such features as the physical configuration of the simulated user. This includes such factors as where the user's body is articulated i.e. where his joints are located, and where the center of mass of each part of his body is located. The magnitude (and direction) of gravity and other environmental forces of the simulated environment are also programmed into the processing unit for use in calculating the effect upon the simulated environment. This process of applying forces in the simulated environment and determining their effect is referred to as "modeling" the simulated environment.

Once the processing unit has determined what the appropriate output corresponding to the current state of the simulated environment is, this output is sent to the display and other output systems for presentation to the user. Although the primary output to the user is via audiovisual presentation, additional output and feedback may be provided as will be discussed below.

In the embodiment illustrated in FIG. 1, visual display is advantageously made via a rear projection screen 150 which is placed in front of the user so as to fill the field of view of a user whose head is being held immobile within the head immobilizing device 120. In this way, a single screen is able to cover the entire field of view of the user without the need for a screen which is attached to the head of the user, such as in a head mounted display. The projector 145 for the screen is connected to the output of the processing unit 160 so that the display may be driven using the ordinary interfaces available to the processing unit.

Alternate means to provide the appropriate visual display includes the use of flat screens. These can include large flat television type screens, such as those produced for home theater systems, which may be located at a distance from the user so as to allow the screen to fill the user's visual field. Smaller flat screens such as LCD panels may also be used. LCD screens provide advantages in both weight and thickness over traditional television type screens (i.e., cathode ray tubes). Through the use of several adjacent LCD screens, the field of view of the user may be filled using less overall screen surface as compared to a single large flat CRT. In general, the use of smaller screens requires placing the screen closer to the eyes of the user in order to properly fill his visual field.

Another alternative makes use of a front projection screen similar to a movie screen. This may advantageously comprise an opaque screen filling the visual field of the user, onto which the images of the simulated environment are projected. Because the head of the user is immobilized with respect to the location of the screen, it is possible to mount the projector directly over the head of the user. Such a system is particularly advantageous when the screen is located at a larger distance from the user's head. Those of skill in the art will recognize that other display types may also be substituted for the rear projection system described herein.

Audio output may be provided via speakers mounted within the head immobilizing device of the input system, or by other speakers positioned near the input device. Because the head of the user will not move significantly within the input device, the relative positions of the speakers to the user's ears may remain constant regardless of their location.

By altering the audio and visual output of the system to correspond to the attempted motions of the user within the input device, an immersive environment can be created within which the actions of the user are reflected within the simulated environment as calculated by the processing unit and presented audio-visually to the user.

Further preferred embodiments may also include structure which allows the user and the audio and visual output systems to be physically moved. This motion can include rotation about any axis, as well as translations in any axis. Such rotation and vibration may be used to add additional realism to the perception by the user of the simulated environment as will be described below.

Somatic feedback such as force or haptic feedback may also be provided to the user through structures mounted upon the input device. One such example shown in FIG. 1A is a pair of vibration devices 135 which are disposed so as to lie on the skin of the user over the nerve spindles of the upper arm muscles. These vibration devices are activated to provide a sensation to the user that the muscle whose nerve spindle is being vibrated is extending. This is controlled by the processing unit 160 so that when the model of the user in the simulated environment is determined to be experiencing motion about a body joint, the appropriate muscular sensations can be provided to the user. This form of haptic feedback is discussed in greater detail below.

Head Immobilization

Figure 2:
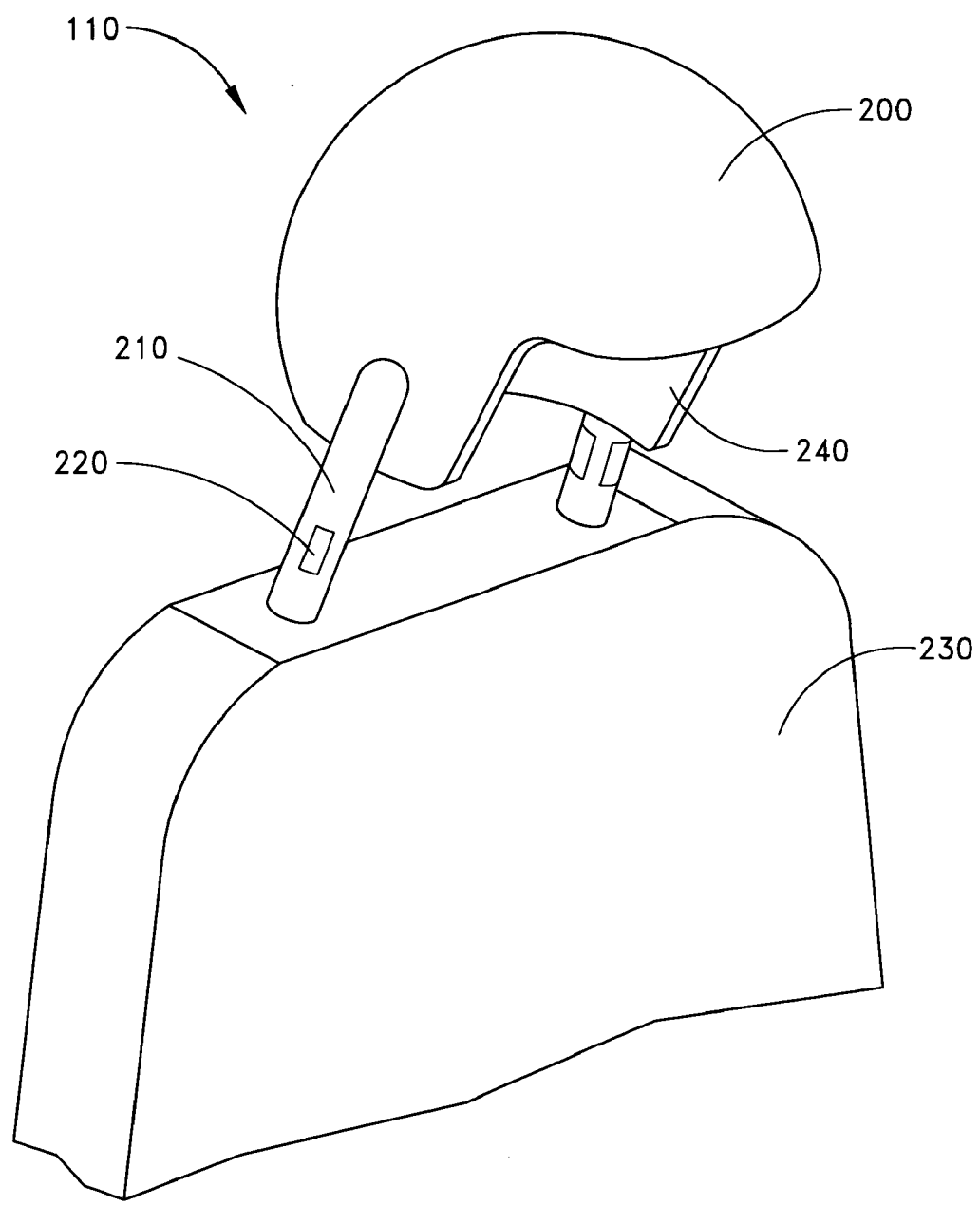
FIG. 2 illustrates a perspective view of a helmet style head immobilizing input device for use with the input and feedback system of FIG. 1A.

An immobilization device 120 in accordance with one preferred embodiment is shown in FIG. 2. The head immobilization device 120 shown is of the helmet type. This consists of a helmet 200 or other snugly fitting head gear which is worn by the user and which is rigidly connected to a supporting structure 230 of the input system 110 by supporting members 210. These hold the helmet 200 in a fixed position with respect to the chair of the input system 110. In this way, when the user is seated within the input device 110 with the user's head snugly positioned within the helmet 200, no relative motion is possible between the user's head and back.

Included upon the support members 210 of the helmet 200 are a number of strain gauges 220 or other deflection measuring devices. Strain gauges are simple electromechanical devices whose electrical properties change in response to extremely small physical deflections. They are inexpensive, easy to use, and have a very fast response time. These properties make strain gauges preferable as force sensing devices. One strain gauge for use in such applications is the Precision Strain Gauge SG-7/350-LY11, available from Omega Engineering, Inc. of Stamford, Conn. Advantageously, strain gauges 220 are disposed upon the supporting members 210 for the helmet such that minute deflections of the support members may be measured using these gauges.

For instance, when the user attempts to rotate his head to look upward, particular forces are imposed upon the support members 210 of the helmet 200 as the user's head presses against the inside surfaces 240 of the helmet. These forces result in very small deflections of the support members 210 which are proportional to the amount of force being exerted by the user as he attempts to elevate his head. The amount of deflection is detected by the strain gauges 220, and is sent to the processing unit 160 for further processing as described below.

In measuring the deflection of the support members, it is advantageous to place strain gauges in pairs on opposite sides to measure deflection in a single axis. A single strain gauge measures deflection in only a single direction. By placing two pairs of strain gauges on each support member, measurements can desirably be made of the complete lateral deflection of a support member. Additional strain gauges may advantageously be positioned to record the deflection at multiple positions along a support member to provide a more complete measure of the magnitude and direction of the forces acting upon the support member. The more completely the deflection of each support member can be measured, the more precisely the forces imparted by the user can be determined. Using the measured deflections of each support member and information determined in advance during calibration describing the amount of deflection which corresponds to a given force, it is possible to determine the amount of force being applied by the user to the input system by measuring the minute deflections of the support members.

Note that it is desirable that the helmet 200 fit as snugly as possible to the head of the user. This is because a fit which allows the user to move his head without it being detected by the strain gauges 220 will result in motion of the user relative to the helmet 200 which will reduce the sense of immersion of the user. The user will be able to move his head in the real world without the simulated world responding to that motion. This causes the user's perceptions of the simulated environment to no longer be based purely upon the responses calculated by the processing unit, but rather also by the motions of the user in the real world independent of the output of the system. This lag in the response of the virtual world to the user input is therefore undesirable.

Furthermore, a fit in which the user can move without detection by the input system requires greater levels of motion by the user in order to be detected. This increases the latency and lag between any attempted motion by the user and the response being reflected in the output of the processing unit. Such a lag may result in disorientation for the user. It is also desirable that the helmet be mounted as rigidly as possible to the chair of the input device. This is because any freedom of motion between the helmet and the chair will allow motion of the helmet to not be detected by the strain gauges. This type of slack is undesirable for the same reasons as described above with respect to the fit between the head of the user and the helmet.

Figure 3B:
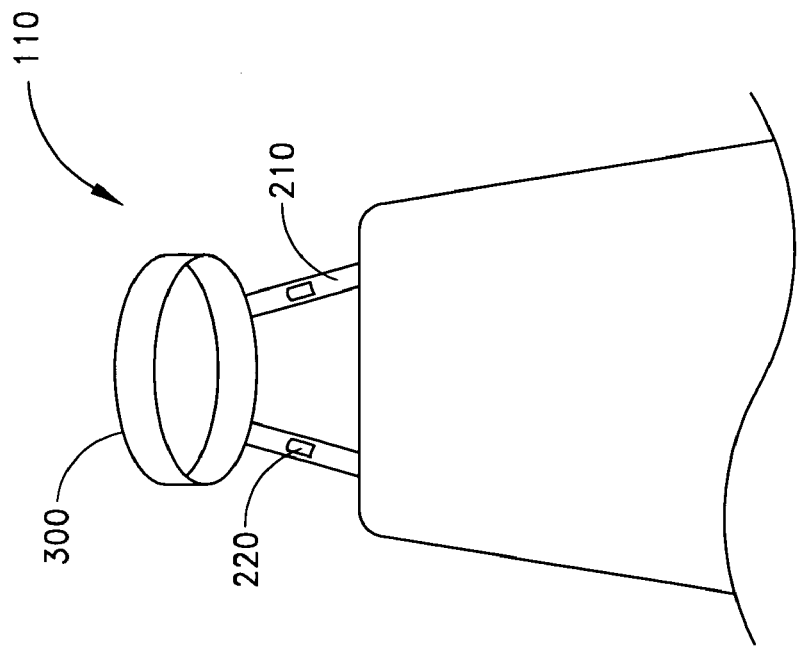
FIGS. 3A and 3B illustrate side and front views of a headband style head immobilizing input device.
Figure 3A:
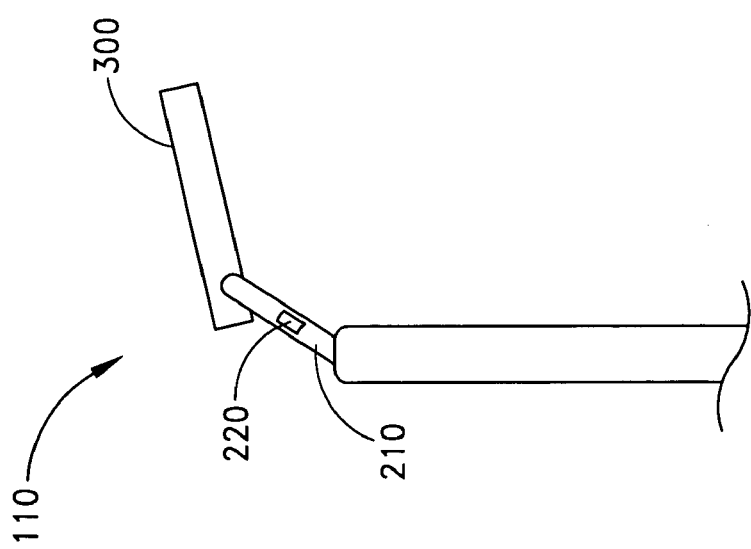

It is possible to use other physical systems to restrain the motion of the user's head in appropriate ways other than a helmet. For example, as shown in FIG. 3, a headband 300 restraint may also be used. The shown embodiment comprises a band 300 which fits snugly around the head of the user about the temples and above the eyes and ears. Such a device, when appropriately fit to the head of the user and rigidly attached to support members 210, provides the same axes of measurement as does the helmet arrangement shown in FIG. 2, but provides for less total mass of the sensor system. The deflections of the support members 210 is advantageously carried out using strain gauges 220, similarly to the embodiment of FIG. 2.

However, it may be necessary to more tightly fit a headband 300 to a user's head than would be necessary for a helmet 200, in order to provide the same level of responsiveness, due to the greater amount of contact surface between the head of the user and the input device when using a helmet type arrangement. Therefore, there may be a trade off between the comfort of the user and the mass and ease of use of the system between the two different input device styles.

Figure 4B:
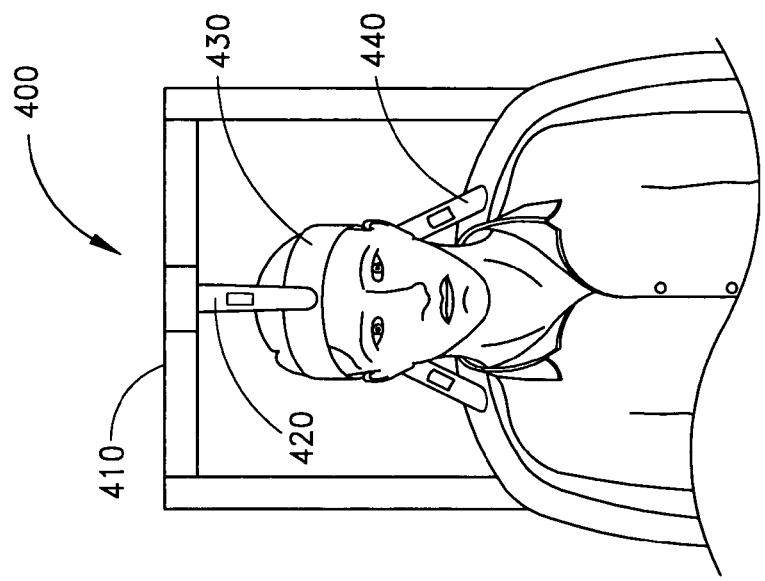
FIGS. 4A and 4B illustrate side and front views of a double brace style head immobilizing input device.
Figure 4A:
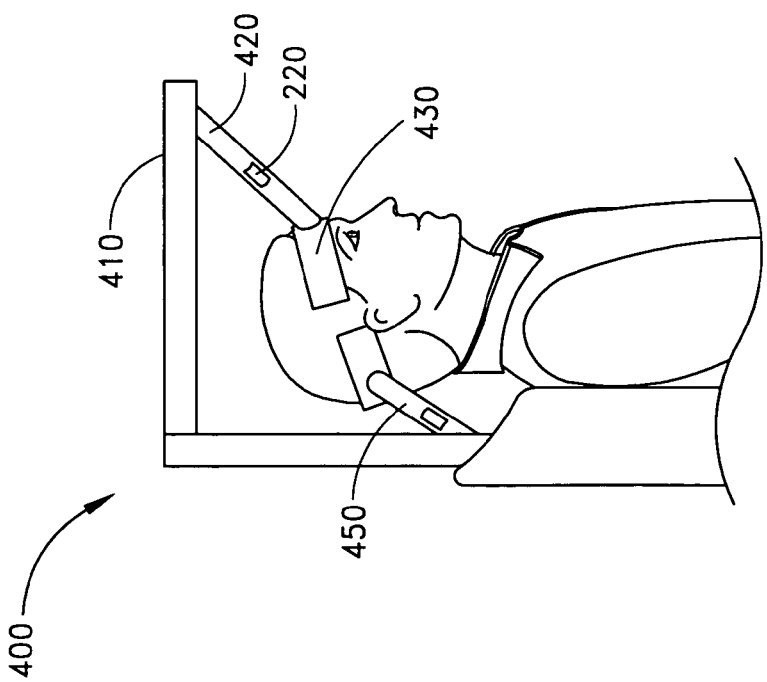

A further variation uses a pair of braces, rather than a full band to provide a secure mounting of the user's head within the input device. Such an embodiment is shown in FIG. 4. This brace securement system 400 consists of two braces, a rear brace 450 of roughly semi-cylindrical shape against which the user rests their head, and a forward brace 430 which is positioned upon the users head and then secured to a support frame 410 using a releasable fastener once the correct position upon the head of the user is achieved.

Using such a system, two sets of support members are used: one set of supports 440 for the rear brace, and a separate support 420 which supports the front brace 430 upon the frame 410. The support members 420, 440 are instrumented using strain gauges 220 in the same manner as in previous embodiments. In this way, a custom fit is provided to the user, while retaining the complete level of measurement that would be provided by a helmet or other system which completely encircled the head of the user. Other mechanical variations which provide the requisite level of immobilization and instrumentation will be apparent to those of skill in the art.

Limb Immobilization Devices

Figure 5A:
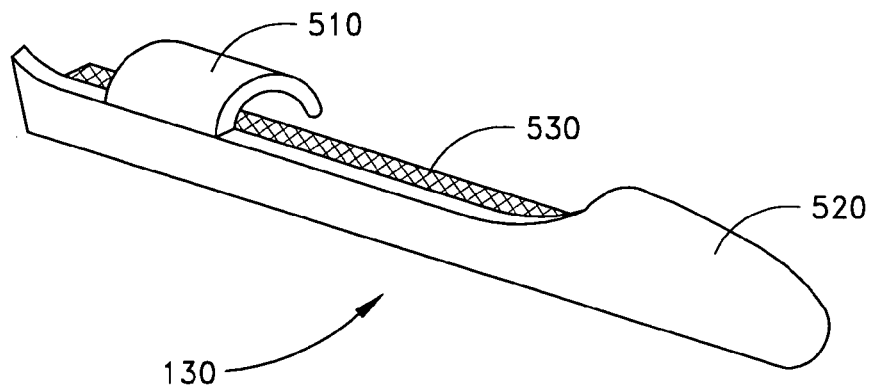
FIGS. 5A and 5B illustrate left front and right front perspective views of an arm immobilizing input and feedback device for use with the system of FIG. 1A.
Figure 5B:
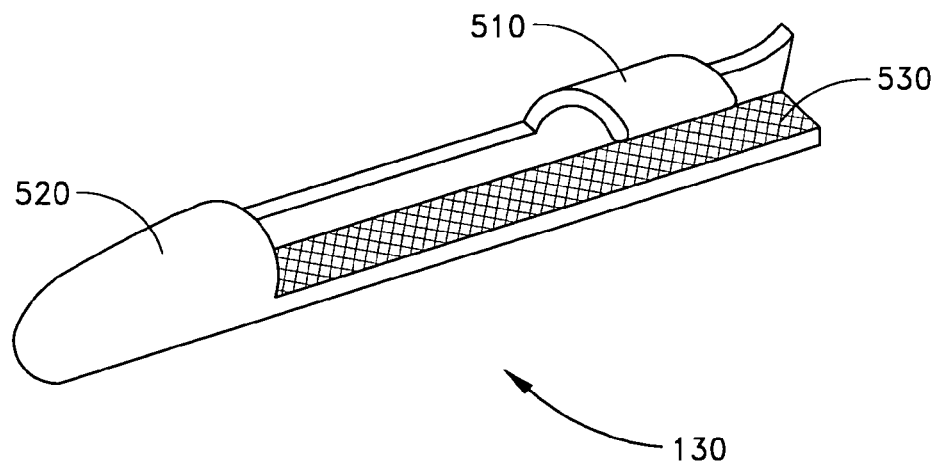

A immobilizing device 130 for detecting input from the arm and hand of a user is shown in FIGS. 5A and 5B. Such a device may be provided for only one arm of the user, or two devices may be used, one for each arm of the user. The illustrated device is configured for the right arm of a user, and should be suitably reversed for use with the left arm.

The device 130 consists of immobilizing cuffs 510, 520 which are disposed upon the supporting structure 530, which itself substantially comprises an armrest for the chair of the input device 110. The first cuff 510 is designed to immobilize the elbow of the user, while the second cuff 520 immobilizes the lower forearm and wrist of the user. By immobilizing these areas, the attempted motion of the entire arm of the user from the wrist to the shoulder can be determined by the processing unit.

Each cuff is designed to support the arm of the user and hold it in a fixed position. In order to do this, the cuffs may be designed using elastic materials which fit snugly around the arm of the user, or releasable clasps may be located within the cuffs, the clasps being secured to the user's arm before activation and use of the device 130. If necessary, straps may be used to allow the cuffs to accommodate and secure the arms of differently sized users. The cuffs include strain gauges which are mounted upon the cuffs or support structure so as to provide the needed information regarding the deflection of the immobilizing device 130. The strain gauges are advantageously mounted upon the support structure adjacent to the cuffs in order to detect deflection of the device due to the translational force applied by the user. Additional strain gauges are advantageously disposed upon the cuffs in order to measure rotational strain caused by any twisting forces applied by the user.

The wrist cuff 520 and forward region of the arm immobilizing device 130 may include buttons, handles, triggers, or other manipulatable elements for use by the user. These may be designed to correspond to the type of simulation which is being provided. For example, a handle and trigger may be provided if a gun is being used in the simulation.

By holding the elbow and wrist joints of the user's arm immobile and measuring the deflections which are imposed upon the device 130, it is possible to calculate the forces which the arm muscles of the user are generating.

Because the arm immobilizing device is rigidly attached to the input system 110, the entire forearm of the user is fixed in position with respect to the torso of the user. Because of this, it is possible to calculate all of the forces generated by the entire arm, including the shoulder, by measuring the deflection within the immobilizing device 130.

For instance, if a force directed laterally outward is detected by the wrist cuff 520, while a laterally inward force is detected by the elbow cuff 510, it can be determined that the user is rotating their forearm about a vertical axis relative to their forearm. Based on the position of the arm in the simulated environment, this motion of the forearm can be calculated and displayed. Note that because the actual forearm does not move within the immobilizing device 130, the direction of any motion which is calculated may not correspond to the actual direction of the forces applied; the motion in the simulated environment will correspond to the direction in which the forces applied in the real world would act if the user's arm were in the position it has in the simulated environment.

For instance, a downward force at the wrist with no force at the elbow corresponds to a force which extends the elbow joint. This motion is a downward motion of the wrist if the arm is in a position such as it is actually held immobile in by the immobilizing device 130. If the user were holding his arm in the simulated environment in such a position (elbow bent, upper arm vertical and forearm horizontally in front of the user), this force would correspond to lowering this hand. If the field of view of the user currently included his arm, he would see his arm extend from an "L" shape at his side to a position hanging straight down.

If however in the simulated environment, due to previous "motion" in response to forces from the user, the arm of the user were in a position where the upper arm extended laterally horizontally from the shoulder, the elbow were bent, and the forearm was horizontal and pointing forward, the same force applied to the immobilization device 130 would now correspond to an extension of the elbow joint which moves the forearm laterally, rather than downward. This might be a sideways striking motion in some form of martial arts simulation. In this case, the user would see (if the field of view included the arm in question) the arm move from an "L" shape extending to his side from the shoulder and then bending forward to an extended position straight out from the shoulder.

In both cases, the forces applied are the same and act relative to the arm of the user in the same way in the simulated environment; both arms move from "L" shapes to straight arm positions. However, because the position of the arm may be different in the simulated environment and the real world, these same forces will result in different motion of the simulated arm depending on the state of the simulated arm at the time when the forces are applied.

A variation upon the arm immobilizing device described above includes a stiff glove which is disposed within the forward cuff 520 and which effectively immobilizes each of the individual fingers of the user. By placing strain gauges upon this glove, the individual forces and motion of each individual finger can be tracked and feedback can be provided in the same manner as is performed for the entire arm. In this way, complex activity involving the use of individual and distinct motions of each joint of each finger could be simulated without placing dedicated hardware within the cuff. For instance, it would be possible for a user to exert forces such that they held their hand in either a fist, a flat position, a position pointing one finger, or grabbing onto something. It would even be possible to simulate the pressing of individual buttons on a keyboard or control panel without having to provide actual buttons within the cuff.

A similar device to that the arm immobilizing device 130 described above for use with the hand and arm of a user may be used for the foot and leg of a user. Such a leg immobilizing device 140, as indicated in FIG. 1, can be designed using substantially the same techniques as those described above for the arm immobilizing device. However, the immobilizing cuffs are applied to the knee, lower shin, and below the ankle, instead of to the elbow, forearm, and below the wrist.

These cuffs are instrumented in substantially the same manner as those for the arm input device. In order to accommodate the greater strength of the leg muscles compared to the arm muscles of a typical person, it may be advantageous to provide for stiffer support members for use with the leg input devices. Through the use of such devices, the entire attempted motion of the leg from the hip through the ankle may be calculated.

Display System

The exemplary display system 145, 150 shown in FIG. 1 uses a rear projection screen. The projector 145 includes an input connector, which receives a signal from an appropriate source, in the instant embodiment that being the video output of the processing unit 160. The projector 145 then projects this display onto the back side of a rear projection screen 150.

In the instant embodiment, the display screen 150 is suspended in front of the user and has a vertical dimension such that all or substantially all of the user's vertical field of view is taken up by the display screen. The screen also has a horizontal dimension which substantially or completely fills the user's horizontal visual field of view.

The shown embodiment is also configured such that the display screen 150 wraps partially around the head of the user. This may be advantageous in that a more constant focal distance is achieved across the entire field of view between the screen and the eyes of the user, thereby providing for a more immersive experience.

The size of screen needed to fill the field of view of the user will vary with the distance from the eyes of user at which the screen is located. One exemplary configuration which fills the visual field of the user makes use of a screen which is located 12 inches in front of the user's eyes, and extends 15 inches above and 45 inches below the level of the user's eyes. The screen extends 12 inches to the side of the user in a direction laterally, and then an additional 15 inches at a 45° offset from perpendicular. A screen of this size will advantageously fill the entire visual field of the user when his head is immobilized.

In many applications, it will be advantageous to use a screen with a smaller dimension, particularly in the vertical dimension below the eyes of the user. This is especially desirable when this visual region is not useful to the simulation. For instance, driving or flying simulations have little use for visual space which is located more than about 45° below the center of view of the user. In such cases, a screen which extends about 15 inches below the level of the user's eyes will provide a sufficient visual environment while advantageously not requiring an unwieldy screen dimension.

The projector 145 is positioned behind the screen 150, opposite the side on which the user is positioned, at a distance sufficiently far away that the projected image fills the entire screen 150 (or the entire field of view of the user). Once properly positioned and focused, the relative positions of the projector and screen may remain constant without disturbing the operation of the system.

An alternate embodiment of the display system could make use of a screen or screens of different geometry, curved for example, which provide a smoother visual experience to the user. Other possible alternatives include front projection systems, i.e. where the projector is located on the same side of the screen as the user. One way in which this could be achieved is for the projector to be located above the head of the user. Flat screens of either LCD or traditional cathode ray tube (CRT) may also be used to provide appropriate visual output.

Another variation involves the use of a display which is rigidly connected to the input device itself. This could be either a small display or pair of displays, similar to the head mounted display systems as known in the art, or could use a larger display located further from the eyes of the user. In particular, the head mounted style of display could be used to provide a three dimensional aspect to the visual environment since a separate image could be provided for each eye of the user, as is known in the art.

Those of skill in the art will recognize that additional display systems may also be used, for example embodiments using multiple screens or multiple projectors, systems which use cathode ray tubes (CRT's) or liquid crystal displays (LCD's) in place of projection screens, systems which use multiple screens in different positions to represent separate views for near and far objects, and other systems such as are known in the art. In particular, since the positional relationship between the eyes of the user and the screen can be fixed throughout the usage of the device, any device which relies upon the positioning of the view point of the user may be successfully used with the system as described herein.

Operation

In order to use the system as described above, the first step is for the user to strap into the input device. The user sits on the seat of the input system 110, and then places his head, hands, and/or feet into the appropriate immobilizing devices 120, 130, 140 of the device. Once in position, the immobilizing devices should be made snug against the head, hands, and/or feet of the user so as to most effectively transmit attempted motion of the user to the processing unit 160. If additional immobilizing attachments for the torso or shoulders are included, they should be attached and made snug as well.

One preferred method of snugly securing the various attachments to the user is through the use of adjustable devices. For instance, in helmet type head immobilizing devices 200 as shown in FIG. 2, a chin strap (not shown) may be used to maintain a secure fit of the user's head against the inner surface 240 of the helmet 200. Differently sized helmets 200 which are releaseably mountable upon the support members 220 may also be used to accommodate users with differently sized heads (e.g., children). Straps may also be used in limb immobilizing devices 130 such as that shown in FIGS. 5A and 5B in order to securely fasten the user within the device.

In head immobilizing devices such as those shown in FIGS. 3A, 3B, 4A, and 4B, it is possible to improve the fit of the headband 300 or braces 430, 450 upon the head of the user by using a compressible foam liner upon the surface of the device which will rest upon the head of the user. By deforming to match the precise shape and position of the head of the user, the foam will allow the headband or brace to rest most securely upon the user's head. It may also be advantageous to provide for gross adjustments of the device. For instance, in FIGS. 4A and 4B it can be seen that the forward brace 430 is held by a support member 420 which depends from an upper frame member 410. By allowing the support member 420 to be positioned at different locations along the upper frame member 410, the same brace 430 can be used to accommodate users with different head dimensions.

As the user sits in the input system 110, signals are continuously sent from the various strain gauges located upon the input device to the processing system 160. It may be advantageous in some embodiments to pass all of the strain gauge signals through a low pass filter in order to eliminate any high frequency signals which may be generated due to small amounts of involuntary motion of the user or noise in the strain gauge circuits. One particularly advantageous technique is to filter out any signal components with a frequency greater than about 50 Hz.

The signals from the strain gauges are received by the processing unit 160 and are analyzed to determine what motion the user is attempting to make based on the magnitude and direction of the forces which are applied to the support members. In order to make this process more effective, the system 110 must first be calibrated to the user and the appropriate zero point set. In order to do this, the user relaxes, and while attempting to make no motions, the processing unit 160 is set to treat the level of signal currently being received from the input device 110 as the "zero force" level. In this way, the ordinary pressure detected by the strain gauges due to the snugness of the attachments and the weight of the user are not improperly read as attempts by the user to move.

Once properly calibrated, the display 145 and other output systems are activated, and the simulation can begin. Throughout the simulation process, the signals from the input system 110 will be interpreted by the processing unit 160. This involves determining the amount of pressure that has been applied to each of the various members which are instrumented with strain gauges, and then calculating the force that the user must have exerted to produce that amount of pressure upon the support members.

For instance, if the strain gauges indicate that the arm mount has deflected inwardly by one—one hundredth of an inch at the elbow cuff, and it is known that each thousandth of an inch deflection requires one quarter pound of force, then we can calculate that the inward force exerted on the arm mount in the direction measured by that strain gauge is two and one half pounds (0.01 inch×0.25 pounds of force/0.001 inch=2.5 pounds of force). Similar calculations can be performed for each direction of deflection which is measured using strain gauges, and a complete set of the forces applied by the user can be calculated. Determining the ratio of force to deflection may be done either by looking up this value based on the material from which the support are constructed, if this is known, or by calibrating the system initially by applying known levels of force and measuring the amount of deflection detected by the strain gauges in response to different levels of force. Once calibrated for a particular set of support members, there should be no need to repeat this process prior to each usage. The calibration to detect the "zero level" of force as described above must however be performed prior to each usage.

These forces represent the amount of effort that the user is putting into some particular motion, e.g. lifting their head, turning their head, pushing with their hand, rotating their shoulder, etc. The processing unit 160 applies these forces to a physical model of the user in the simulated environment, and based upon this model, adjusts the display 145 of the simulated environment in response to the user's actions as detected by the input system 110. The forces measured by the input system are applied to the physical model. So if the input system measures a force to the left being applied by the user's left temple against the headband, and a force to the right being applied to the headband behind the user's right ear, the system will apply these forces to the model of the user in the simulated environment (which may include items attached to the user's head, such as a helmet) and determine that the user's head should turn to the left under the measured forces.

Because the forces, when applied to the model of the user in the simulated environment, indicate that the user has begun to turn his simulated head to the left, the processing unit will alter the display by sliding everything to the right. Although the user cannot actually turn his head within the immobilizing device 120, by presenting a visual display which is consistent with what the user would see if his head actually turned to the left, the visual experience of the user corresponds to the motion attempted, even though that particular motion did not actually occur.

The processing system is programmed to take into account the amount of force required to accelerate the head of the user rotationally, as well as the amount of force required to hold the head at a particular angular orientation. In this way, the system can calculate how much to displace the visual display in response to the force applied by the user. This also allows the system to accurately simulate the limitations upon the rotation of the user's simulated head. For example, no amount of force applied by the muscles of a user's neck will allow a person to spin their head through a complete 360°. This same limitation can be simulated by requiring additional force to turn the user's virtual head as the amount of deflection from front and center is increased.

Furthermore, because the user's head does not actually rotate, the display can easily be positioned in a stationary position such that it fills the user's entire field of view, thereby providing a more complete visual experience than if the user were simply watching a screen which filled a small portion of the user's field of view.

Feedback

The system provides feedback to the user by virtue of the immobilization of his joints. Any time that the user attempts to turn his head or lift his arm, he must exert some amount of pressure against the helmet 120 or arm immobilizing device 130. By controlling the amount of response that the user receives for a given level of pressure, the processing unit 160 can effectively control the amount of "resistance" that the user feels to any given motion. The response provided includes what the user observes visually as well as physical sensations which may be applied to the user through force feedback and other techniques which will be described below. This matches the normal experience in the real world: force is exerted instinctively based on how effective that force is at accomplishing our goals. If we push on a door and it doesn't open, we push harder until we begin to get the desired effect of the door swinging open.

If for example, the simulated world is such that the user is not wearing anything on their head, then the physical model which is used for the turning of the user's head will respond very quickly to any attempted rotation of the head. A force which indicated rotation of the head to the left will result in fairly rapid leftward rotation of the head in the simulated environment (as indicated by the apparent motion of the visual field to the right).

If on the other hand, the user were wearing an extremely heavy armored helmet in the simulated environment, the physical effect of this upon the user can be simulated by applying a physical model which takes into account the mass and inertia that such a helmet would have. Therefore, the same amount of force which produced a rapid leftward acceleration of the head when it was modeled as unencumbered will now produce a lesser rotational acceleration. Similarly, when the user attempts to stop turning their head, they will have to press harder against the input device in order to properly arrest the motion once started.

Even with no direct physical force being applied to the user under the control of the processing unit other than the restraint of the input device itself (i.e. with no mechanical effort being imposed upon the user), simply by forcing the user to exert pressures and forces which correspond to the forces needed in the simulated world, the user "feels" that their head is "heavier".

For instance, if the user exerts forces which indicate he is trying to tilt his head backward to look up, this will require fairly light forces if he is not wearing a heavy helmet in the virtual environment. Some light pressure will rotate his head rearward, directing his view upward in the simulated environment. When he wishes to return to looking forward again, only a light downward rotational force will be required.

However, if the simulated environment is programmed to include a heavy helmet on the head of the user, things will happen differently. The user will still need to exert a force to tilt his head backward at first, and the display will indicate that his head is tilting by scrolling the visual display downward. However, at some point, when the processing system 160 determines that the center of gravity of the helmet (if sufficiently heavy) is now helping to pull the head of the user backwards, the display will rotate backwards more quickly unless the user begins to apply force to resist the weight of the helmet pulling his head backwards. If the user exerts no force, the user's head position (as indicated by the visual display) will rotate backwards until the limit of motion of the user's neck (as programmed into the processing system) is reached.

At this point, to return to the normal front and center view, the user will have to exert a much greater downward rotating force than was needed when no helmet was programmed into the simulated environment. This is because the user must not only rotate their own head, but effectively rotate and lift the mass of the helmet as well. Unless the user exerts this higher level of force, the visual display does not rotate in a manner which indicates that the user's head is moving back to the normal position. By simply programming different behavior into the system to simulate the added weight and mass of the helmet, the user is made to exert forces as if they were actually wearing such a helmet upon their head.

This same effect can be used to produce feedback even when no motion is actually occurring. For instance, in order to simulate the weight of a heavy metal helmet, the processing unit can be programmed to model how the weight of the helmet would effect the head of the user even when the user is standing still. For example, if the helmet is sufficiently heavy, it will tend to tip the user's head forward unless he exerts extra pressure with his neck in order to keep his head upright. In the absence of such force, the display and other output systems will indicate that the user's head is tilting forward. In order to counter this, the user will naturally attempt to physically lift his head, exerting a force upon the actual immobilizing helmet of the input device. When the appropriate level of force is exerted, the output indicates that the user is lifting his head.

However, if the user does not exert this backward rotating force, his head (in the simulated environment) falls forward again in response to the "weight" of the "helmet". In this way, the user is compelled to exert forces against the stationary immobilizing input device constantly, even without the input device having any capability for more traditional forms of "force feedback" (e.g. applying forces to a traditional input device such as a joystick or steering wheel to provide resistance or vibration to the user). Of course, traditional "force feedback" techniques can be combined with the techniques described herein to enhance the immersive effect, as described below.

Using techniques such as these, feedback corresponding to most physical characteristics of mass can be provided. For example, to simulate that the user cannot lift his arm, it is only necessary to program the simulated environment to refuse to allow any motion of the arm of the user in response to any level of force from the user. If on the other hand, one wanted to simulate that the user was holding a heavy object in his hand, for instance a rifle, the system could be programmed to require a certain amount of force be applied to the input system by the user's arm simply to keep the rifle in position.

Suppose that the simulated user is carrying a heavy rifle. As he normally walks along, the user exerts no force using his arm, and so that representation of the arm holding the rifle in the simulated environment shows the arm hanging downward at the user's side and the rifle pointing downward. When the user decides to lift the rifle up in order to use it, he must exert forces with his arm. By doing so, the representation of the user's arm and the rifle in the simulated environment respond and the rifle is lifted to shoulder level. Appropriate haptic feedback, as described below, is also used so that the user feels as though his arm has raised. If the user does not continue to exert some amount of force (but less force than was needed to lift the rifle in the first place), the "weight" of the rifle in the simulated environment will cause the rifle to drop and the user's aim to change in the simulated environment. The user will be able to tell that the rifle is dropping because he will see the rifle droop from the desired aim point. Additional haptic feedback may be provided so that the user feels as though his arm drops unless he continues to apply upward force.

Unless the user exerts a steady upward pressure upon the immobilizing device 130 which exactly matches the force needed to hold the rifle level in the simulated environment, the rifle's elevation will drift in the simulated world. This requires the user to exert a steady lifting force, just as he would have to exert to hold a rifle steady against the force of gravity in the real world.

By contrast, if the user were resting the rifle upon a fence or other support in the simulated environment, the user would not need to exert the same amount of force to hold the rifle steady; the fence would be carrying some of the simulated rifle's simulated weight.

By forcing the user to exert forces against the immobilizing members of the input device in order to accomplish his goals, the user can be made to exert as much force as would be required in the real world (for at least the immobilized muscles) in order to perform the motions which are being performed in the simulated environment.

In this manner, the immobilized portions of the users body not only provide for natural, intuitive input to the system, but also provide for feedback which allows the user to feel the forces which correspond to the forces within the simulated environment.

Although not discussed in detail herein, the techniques described above may be applied to any portion of the body which can be effectively immobilized physically and whose motion corresponds to muscular forces applied by the user. Although these techniques might be applied to almost the entire skeletal-muscular system (for example, immobilizing the torso to allow the detection and feedback related to rotation of the back and hips), of particular interest are devices which operate upon the arms and legs of a user. Motion of the arms, hands, feet and legs are the most commonly used motions in most real life activity, and are therefore the most useful in most simulated environments as well (e.g. driving a car and flying a plane require the use of both the hands and feet for proper control of the vehicle).

Additional Somatic Feedback

In addition to the techniques described above, feedback may be provided to the user which further enhances the impression that actual motion of the user's body is taking place even though a particular joint may be immobilized. Such techniques include force and motion feedback, tactile feedback and vibration-induced motion illusions.

Force feedback refers to systems which apply a force to a system which is being operated by a user in order to simulate the forces that a user would actually feel when using such a system. For instance, force feedback may be used with a steering wheel control input to a driving simulator. As the user accelerates, the amount of force which he must apply to the steering wheel changes based upon the speed at which the simulated vehicle is operating, as well as whether or not the car has good traction or poor traction. Force feedback may also be used to apply transient forces to an input device, for instance, vibrating a steering wheel to simulate the vibration of a car's engine, or shaking the steering wheel violently when driving over rough roads.

Motion feedback refers to systems which actually move the user or a part of the user in response to the simulated environment. This type of feedback is used in systems such as flight simulators when the entire cockpit environment is tilted or shaken in order to simulate the forces which would be felt by the user.

This type of feedback can be especially useful for simulations where the user's entire body is subject to substantially the same forces (driving and flying simulators, for example). This is because the rotation of the user about the pitch (lateral) and roll (longitudinal) axes reorients the user with respect to gravity. This allows the use of gravity to apply forces to the user in directions other than directly downward (relative to the user). For instance, when accelerating forward in a car, the actual force felt by the user is downward (gravity) plus a rearward component (being pressed into the seat by the acceleration). This can be simulated by tilting the user backward so that the resultant force felt by the user points in the same direction as would be experienced in reality.

When used with immobilization techniques as described herein, the result may be an immobilization system 110 as shown in FIG. 1A where the entire system 110 as well as the display 150 is capable of being rotated or translated as a whole so as to provide motion feedback without interfering with the visual environment with which the user is presented. In this way, the user can experience the force associated with lying on his back, for example, by being tilted so that he is looking straight up in reality, when this corresponds to the forces present in the simulated environment (for example, during very high forward acceleration). However, the visual display is capable of being controlled independently, so that the user still sees the world as if he were sitting upright in the cockpit of an airplane, for example.

Tactile feedback refers to the application of pressure of varying kinds to the skin of a user. By pressing against a user with varying forces and in various patterns, it is possible to produce tactile sensations which simulate physical sensations of touch against solid surfaces of various textures, liquids, sticky substances, and other touch based sensations.

Vibration induced illusory motion is a result of vibrations of particular frequencies being applied to the muscles of a user. By activating a small vibrating element placed near a nerve spindle of a particular muscle, the user's brain feels the sensation of the muscle moving, even when it is not. By coordinating this vibration with the visual cues and physical model of the simulated environment, it is possible for the user to feel as though he is moving, even though he is being held immobile. This type of system will be referred to as "haptic" feedback herein.

Such haptic feedback which may produce perceived motion even in the absence of actual motion of the body is documented in "Proprioceptive Illusions Induced by Muscle Vibration: Contribution by Muscle Spindles to Perception?" by Guy M. Goodwin, D. Ian McCloskey and Peter B. C. Matthews (Science 715:1382–1384 published 24 Mar. 1972), which is hereby incorporated herein in its entirety. As documented in this article, when a vibration of about 100 Hz frequency and 0.5 mm amplitude was applied to a nerve spindle located near the tendon of one of the upper arm muscles (i.e. the biceps or the triceps) the subject perceived that the elbow joint was moving in a manner consistent with the extension of the muscle whose spindle was vibrated. The article points out that similar haptic illusions have been shown for other muscles, such as the corresponding muscles in the leg which operate the knee joint.

It is contemplated that these various techniques may advantageously be used individually where appropriate in presenting a given simulated environment. They are even more effective when they are coordinated with one another. For instance, while force feedback in a steering wheel input device may provide the user with a sense of "road feel" and provide for a better driving simulator, the experience is made more immersive when this is combined with motion feedback which allows the user to feel the acceleration of the vehicle as it speeds up and brakes and travels around corners. Similarly, the experience of force feedback upon a joystick used to simulate a sword is rendered more immersive if tactile feedback is combined so that the user is made to feel the motion of the sword grip within his hand as he swings the sword or strikes an opponent.

In a similar way, the use of haptic, or "passive," feedback can be used to provide a sense of body motion to the user, even when the user is being held immobile. Although it is contemplated that such feedback may be used for any and all appropriate muscles, including those that cause movement of the head, this haptic feedback can be particularly advantageous when used with limb immobilization. This is because unlike head immobilization, in which visual feedback will always provide some sense of what is happening, the user may not always be looking at their hands, arms, or feet. Because of this, they may not realize that they have relaxed, possibly allowing their sword to drop to their side in the simulated environment instead of being held ready.

To provide this type of feedback, the limb immobilization devices may advantageously be provided with small vibrating elements or signal generators, which include, for example piezoelectric buzzers or vibrators, which are located over the nerve spindles for each muscle whose motion is to be simulated. These may advantageously be designed to provide vibrations of about 100 Hz frequency and 0.5 mm amplitude, although it is contemplated that other frequencies and amplitudes may be used. The spindles are located in the region of the tendon which connects one end of a muscle to the skeletal structure. Such a configuration is shown in FIGS. 6A and 6B.

The embodiment shown includes an arm immobilization input system, similar to that shown in FIGS. 5A and 5B. In addition to the input and immobilization aspects illustrated in FIGS. 6A and 6B, vibrating elements 135 are also included. These are attached to the skin of the user at a location substantially adjacent to the nerve spindles of the user's biceps and triceps muscles. This places the vibrating elements 135 generally on the lower portion of the upper arm above the elbow, one located toward the front surface of the arm (for the biceps muscle) and one toward the rear (for the triceps). Additional vibrating elements may be included to stimulate muscles other than those of the upper arm, including without limitation: the muscles of the forearm, the muscles of the upper and lower leg, the muscles of the shoulder, the muscles of the torso, and the muscles of the fingers. For use with some muscle groups, particularly groups which are located within the immobilized region of the body, such as the forearm, it may be advantageous to locate the vibrating elements within the immobilization device or the straps and cuffs of the immobilization device, thereby avoiding having to independently attach the vibrating elements to the skin of the user.

Figure 6A:
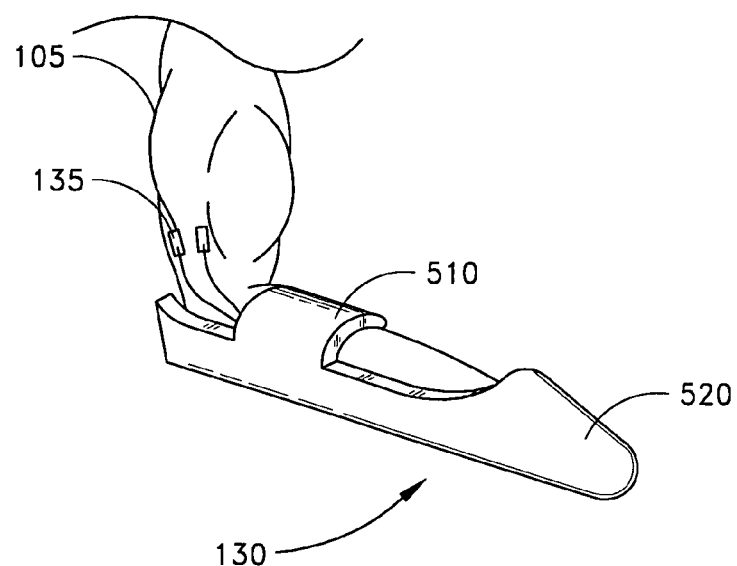
FIGS. 6A and 6B illustrate the arm immobilizing device of FIGS. 5A and 5B respectively with vibrating elements in place upon a user's arm.
Figure 6B:
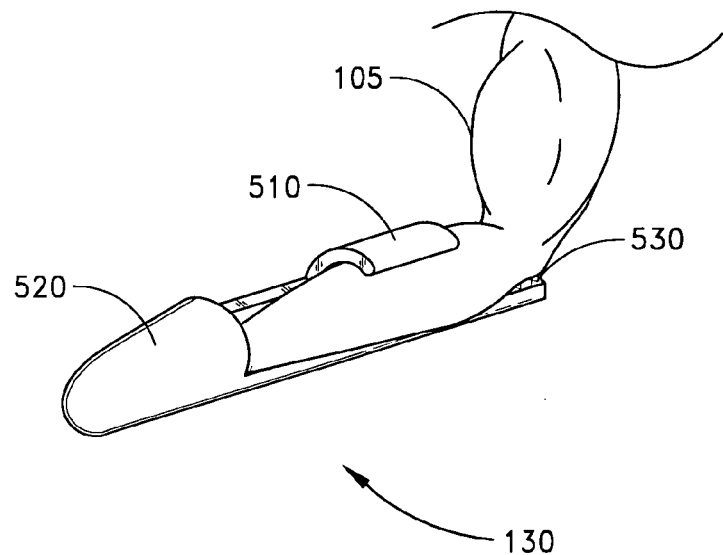

To simulate elbow motion, vibration elements 135 are used upon the spindles of the biceps and triceps muscles as shown in FIGS. 6A and 6B. In ordinary motion of the elbow joint, signals are sent to the brain when the muscles extend (that is, when they are moving and not in use). These signals are sent by the nerve spindle which is located near the junction of the muscle and the bone to which the muscle anchors. As the muscle extends, signals are sent from the spindle to the brain. The brain uses these signals to determine the position of the arm without the need to look at the arm. In order to convince the brain that the elbow is straightening and produce the haptic illusion when the arm is immobilized, it is necessary to trigger vibrations for the muscle which would be extending for the motion being represented in the simulated environment.

When the elbow is straightened, this muscle is the biceps. Conversely, to simulate that the elbow is flexing, the triceps spindle is vibrated, since the triceps extends when the elbow flexes. This technique may be used for whatever muscles move in response to the motion of any joint being simulated (e.g. leg muscles to simulate knee motion). The vibration along the nerve spindle causes the signals which are normally sent from the nerve spindle and which indicate the state of the muscle to be suspended. Instead, the nerve spindle responds to the vibration and sends signals which indicate a condition other than what is actually occurring to the muscle, i.e. the signals indicate that there is motion (extension) of the muscle when there actually is none.

Control of the vibrating elements 135 is handled by the processing unit 160. When the processing unit has determined, based upon the model of the user in the simulated environment, that the user's body is moving about a joint, such as the elbow, it determines which muscles will extend when that motion occurs. Generally, the muscles which are extending are the muscles which are not being used to produce the force giving rise to the "motion" in the simulated environment. For example, the user exerts the biceps to flex the arm about the elbow, and the triceps muscle extends. Conversely, the user exerts the triceps muscle to extend the arm, causing the biceps to extend.

Therefore, when the user exerts the biceps muscle to attempt to flex his arm, it is held immobile by the immobilization device. However, the forces being exerted by the biceps muscle are detected by the strain gauges disposed upon the arm input device. These forces are converted to signals which are sent to the processing unit 160 and used to calculate the direction and magnitude of force which would be applied by the user in the simulated environment. Based upon the model of the user in the simulated environment, the processing unit determines how the user's body would move if not immobilized (the arm would flex) and determines which muscles would extend in response to such motion (the triceps). The vibrating elements corresponding to these muscles are then activated for the duration of the motion in the simulated environment.

Through this combination of feedback based upon the user's own sense of the force he is exerting, haptic feedback providing a sensation of muscle extension, and visual feedback when the motion produced is visible to the user, a more complete sense of bodily motion is provided to the user, making the experience of the simulated environment more immersive. The brain receives an indication from the muscle spindle that the body has moved when it hasn't actually.

In addition to usage in simulations where an entire simulated environment is created through the use of the processing system and visual display, this form of immobilizing input and feedback systems may also be advantageous for use with certain real world control systems. These may include the operation of remote manipulators of various kinds, such as bomb disposal robots or construction equipment. This may also be useful for control of remotely operated puppets or computer generated characters such as are used in shows or television.

The illustrated embodiments of immobilizing input devices and output systems are intended merely to be exemplary. An input/feedback system can only include one of the described means for inhibiting motion of a joint; it need not include all of those described. In addition, any combination of the devices and techniques described herein are also possible.

The input/feedback system thus provides an immersive experience which allows the simulation of a wide variety of environment for the user, including various physical effects on the user himself, such as the effect of various limitations upon his motion. In addition, the system provides for intuitive input into the computer of information which corresponds to the attempted motions of the user of the system.

Although this invention has been described in terms of a certain preferred embodiment and suggested possible modifications thereto, other embodiments and modifications apparent to those of ordinary skill in the art are also within the scope of this invention. Accordingly, the scope of the invention is intended to be defined only by the claims which follow.

What is claimed is:

1. An input system for use with a simulated environment, comprising:
   an immobilizing device which restricts motion of a portion of a user's body;
   sensors which detect forces applied by the restricted portion of the user's body; and
   a sensory feedback device which provides a sensation to the user corresponding to motion which occurs in the simulated environment.

2. An input system as in claim 1 wherein the forces detected by the sensors are sent to a processing unit to determine motion of the user in the simulated environment to which the sensations provided by the sensory feedback device will correspond.

3. An input system as in claim 1 wherein the sensors comprise strain gauges which are disposed upon the immobilizing device.

4. An input system as in claim 1 wherein the sensory feedback device comprises at least one vibrating element which is disposed substantially adjacent to a nerve spindle of a muscle of the restricted portion of the user's body.

5. An input device as in claim 1 wherein the sensory feedback device is used to provide a sensation of movement to the user when no actual movement of a type corresponding to the sensation occurs.

6. A method for providing feedback to a user of a processing unit, comprising the steps of:
   providing an immobilizing device which holds a portion of the user's body immobile;
   providing vibrating devices disposed upon the immobilizing device and positioned to touch an immobilized portion of the user's body near muscles which would extend if the immobilized portion of the user's body moved;
   sending signals from the processing unit to the vibrating devices to cause the vibrating devices to vibrate; and
   controlling these signals to cause the vibrating devices located near a particular muscle to provide feedback indicating that the immobilized portion of the user's body is moving.

7. A method as in claim 6 wherein the signals sent to the vibrating devices by the processing unit are controlled based upon forces exerted by the immobilized portion of the user's body against the immobilizing device.

8. A method as in claim 7 wherein the forces exerted against the immobilizing device are measured using strain gauges disposed upon the immobilizing device.

9. A method as in claim 7 wherein the signals are sent to the vibrating devices and the feedback provided indicates to the user that the immobilized portion of the user's body is moving in a way it would have moved were it not immobilized.

10. An input system for a user, comprising: an immobilizing device which restricts motion of a portion of the user's body; a vibrating device disposed substantially adjacent to a nerve spindle of a muscle of the user's body which extends when the restricted portion of the user's body moves; and a processing unit which sends signals to the vibrating devices to control operation of the vibrating devices, the processing unit controlling the signals to cause the vibrating devices located adjacent to a particular muscle to provide feedback indicating that the restricted portion of the user's body is moving.

11. An input system as in claim 10 wherein the vibrating device comprises a signal generator adapted for connection to a body at a location where the signal generator effects a signal sent by the nerve spindle to a brain.

12. An input system as claim 10 wherein the signals sent to the vibrating devices by the processing unit are controlled based upon the forces exerted by the immobilized portion of the user's body against the immobilizing device.

13. An input system as in claim 12 wherein the forces exerted it the immobilizing device are measured using strain gauges disposed upon the immobilizing device.

14. An input system as in claim 10 wherein the signals are sent to the vibrating devices and the feedback provided indicates to the user that the immobilized portion of the user's body is moving in the way it would have moved were it not immobilized.

15. A method for providing an indication to a user that his body has moved when it has not, comprising:
   preventing an intended motion of a portion of a user's body, wherein the portion of the user's body is substantially immobilized;
   detecting the intended motion of the portion of the user's body; and
   providing sensory feedback which is a reflection of the intended motion.

16. A method as in claim 15 further comprising the step of immobilizing the portion of the uses body.

17. A method as in claim 15 wherein the sensory feedback comprising a vibration produced by a vibrating element placed against the user's body.

18. A method as in claim 17 wherein the sensory feedback provided suspends the feedback provided naturally by the user's body which reflects an actual motion of the portion of the user's body.

19. A method as in claim 16 wherein the step of immobilizing a portion of the user's body further comprises attaching the portion of the user's body to a rigid structure so as to restrict the motion of the portion of the user's body.

20. A method as in claim 19 wherein the step of detecting the intended motion comprises measuring a force applied against the rigid structure by the immobilized portion of the user's body.

21. A method as in claim 20 wherein the force applied against the rigid structure is measured by using strain gauges to detect the deflection of the structure due to the force applied against it.

22. A method as in claim 15 wherein the step of detecting the intended motion comprises measuring the direction and magnitude of the forces applied by the immobilized portion of the user's body.

23. An input system for use with a simulator, comprising: an immobilizing device; a processing unit; and an output system, the immobilizing device holding a head of a user in a substantially fixed position with respect to the user's torso and further comprising sensors to detect a force exerted by the user in attempting to move the user's head, and the processing unit calculating an effect of the force applied by the user in a simulated environment and presenting this effect in the simulated environment to the user via the output system.

24. An input system as in claim 23 wherein the output system corresponds to a remotely operated physical device which is operated according to the input system and which is controlled through the processing unit and represented in the simulated environment.

25. An input system as in claim 23 further comprising vibration devices, the vibration devices touching the user within the immobilizing device and being controlled by the processing unit to provide sensations for the user which mimic the sensations which would be felt during motion of the immobilized portion of the user's body as it moves in the simulated environment.

26. An input system as in claim 23 wherein the processing unit is programmed to use a physical model for the simulated environment, the processing unit configured to provide passive feedback to the user to reflect the forces that are applied to the user in the simulated environment.

27. An input system as in claim 23 wherein the immobilizing input device comprises a securement device within which the user places his head and which is rigidly attached to a seat upon which the user sits during use of the input system.

28. An input system as in claim 27 wherein the securement device comprises a helmet.

29. An input system as in claim 27 wherein the securement device comprises a stiff headband.

30. An input system as in claim 27 wherein the securement device comprises a pair of substantially semi-circular braces, one of which is placed upon a rear of the user's head and the other of which is fit snugly to the front of the user's head above eyes and about temples.

31. An input system as in claim 27 wherein the securement device is attached to the seat of the system using at least one support member.

32. An input system as in claim 31 wherein the sensors are disposed upon the support member.

33. An input system as in claim 23 wherein the sensors comprise strain gauges.

34. An input system as in claim 33 wherein the sensors are disposed in two sets of opposing pairs on each support member.

35. An input system as in claim 23 further comprising at least one additional immobilizing device which holds an arm of the user from an elbow to a hand in a substantially fixed position with respect to the torso of the user and which further comprises sensors disposed so as to measure the forces exerted by the arm of the user at least at a point near the elbow of the user and at a point near a wrist of the user.

36. An input system as in claim 35 wherein the additional immobilizing device detects the forces exerted by the user in attempting to move his arm and sends this information to the processing unit.

37. An input system as in claim 23 further comprising at least one additional immobilizing device which holds a leg of the user from a knee to a foot in a substantially fixed position with respect to his torso and which further comprises pressure sensors disposed so as to measure the forces exerted by a leg of the user at least at a point near the knee of the user and at a point near an ankle of the user.

38. An input system as in claim 37 wherein the additional immobilizing device detects the forces exerted by the user in attempting to move said leg and sends this information to the processing unit.

39. An input system as in claim 23 wherein the visual display of the output system fills substantially all of a visual field of view of the user when the user's head is immobilized within the input system.

40. An input system as in claim 39 wherein the visual display comprises a screen which is positioned between the user's head and a projection system located on an opposite side of the screen as the user's head.

41. An input system as in claim 23 wherein additional input signals are sent to the processing unit by an additional input device disposed upon the immobilizing device.

42. An input system as in claim 41 wherein the additional input device comprises a gun handle and trigger.

43. An input system as in claim 41 wherein the additional input device comprises at least one button.

44. An input system as in claim 41 wherein the additional input device comprises a joystick.

45. An input system for use with a computer, comprising at least one immobilizing device which holds a portion of a body of a user of the system in a substantially fixed position, the immobilizing device comprising sensors and vibration devices, the sensors being configured to detect forces exerted by the user in attempting to move the portion of the body held by the immobilizing device, the sensors sending signals representing a magnitude and direction of these forces to the computer, and the vibration devices disposed upon muscles of the user and controlled by the computer so as to provide sensations which mimic the sensations which would be felt if the attempted motion had occurred.

46. An input system as in claim 45 further comprising a movable frame which is connected to the computer and actuators which are capable of moving the fame, wherein the user and the immobilizing device are located within the frame, and the actuators are controlled by the computer so as to coordinate motion of the frame to provide motion feedback to the user of the system.

47. An input system as in claim 45 wherein the head of the user is immobilized with respect to a torso of the user by the immobilizing device and further comprising a visual display disposed in fixed relation to the user's head, the display connected to the computer and configured to provide visual feedback to the user of the system.

48. An input system as in claim 47 wherein the visual feedback provided encourages the user to apply forces to the immobilizing device in order to control the visual display.

49. An input system as in claim 45 wherein the input system is used to control a physical device which is connected to the computer.

50. An input system as in claim 49 wherein the physical device comprises a remotely operated machine.

51. An input system as in claim 49 wherein the computer controls the vibration devices to provide feedback to the user which is based upon the motion of the physical device.

52. A method for a user to control an environment simulated on a computer system where the user is modeled within the simulated environment, comprising:

providing at least one immobilizing device which restricts motion of at least a portion of the user's body;

detecting forces exerted by the immobilized portion of the user's body against the immobilizing device;

sending a signal representing these forces to the computer system; and determining an effect that these forces have upon the model of the user in the environment simulated by the computer.

53. A method as in claim 52 wherein forces exerted by the immobilized portion of the user's body are detected by measuring deflection of the immobilizing device.

54. A method as in claim 53 wherein the deflection of the immobilizing device is measured using strain gauges disposed upon the immobilizing device.

55. An input system for use with a simulated environment, comprising:
- an immobilizing device which holds a portion of a user's body in a substantially fixed position;
- sensors which detect forces applied by the portion of the user's body that is held in the substantially fixed position; and
- an output device which provides a sensation to the user corresponding to motion that occurs in the simulated environment, the motion is related to the detected forces.

56. An input system according to claim 55, further comprising:
- a processing device in communication with the sensors and the output device, the processing device determines the motion in response to the sensors and provides information to the output device corresponding to the motion.

57. An input system according to claim 55, wherein:
the output device is a visual display device.

58. An input system according to claim 55, wherein:
the output device is a vibrating device.

* * * * *

UNITED STATES PATENT AND TRADEMARK OFFICE
CERTIFICATE OF CORRECTION

PATENT NO. : 7,117,136 B1 Page 1 of 1
APPLICATION NO. : 09/641591
DATED : October 3, 2006
INVENTOR(S) : Rosedale It is certified that error appears in the above-identified patent and that said Letters Patent is hereby corrected as shown below:

Col. 20, line 34: After "the" and before "body" delete "uses" and substitute --user's--

Signed and Sealed this

Sixth Day of March, 2007

JON W. DUDAS
*Director of the United States Patent and Trademark Office*